(12) United States Patent
Douglin et al.

(10) Patent No.: US 6,619,695 B2
(45) Date of Patent: Sep. 16, 2003

(54) TELECOPIER COVER SHEET ASSEMBLY PACKAGE

(76) Inventors: Jennifer Y. Douglin, 1000 Rock Ridge Bluff #1035, Fort Worth, TX (US) 76112; Gregory D. Taylor, 2908 Osage La., Denton, TX (US) 76210

( * ) Notice: Subject to any disclaimer, the term of this patent is extended or adjusted under 35 U.S.C. 154(b) by 181 days.

(21) Appl. No.: 09/768,853

(22) Filed: Jan. 23, 2001

(65) Prior Publication Data

US 2002/0096876 A1 Jul. 25, 2002

(51) Int. Cl.[7] ............................................... B42D 15/00
(52) U.S. Cl. ........................................ 283/94; 358/400
(58) Field of Search .............................. 283/91, 94, 72, 283/902; 358/400; 206/229, 233; 383/166, 106; 229/71, 301

(56) References Cited

U.S. PATENT DOCUMENTS

| 5,178,420 A | | 1/1993 | Shelby | 283/94 |
|---|---|---|---|---|
| 5,350,199 A | * | 9/1994 | Young et al. | 283/81 |
| 5,431,451 A | | 7/1995 | Bork et al. | 283/94 |
| 5,435,601 A | | 7/1995 | Casari | 283/94 |
| 5,533,810 A | * | 7/1996 | Jensen | 383/66 |

FOREIGN PATENT DOCUMENTS

| WO | WO9003277 | * | 4/1990 | 283/94 |
|---|---|---|---|---|

* cited by examiner

Primary Examiner—Willmon Fridie, Jr.
(74) Attorney, Agent, or Firm—Jenkens & Gilchrist, P.C.

(57) ABSTRACT

A telecopier cover sheet comprising transparent membrane for legible marking thereon and at lease one oppositely disposed membrane section assembled thereagainst and adapted for supporting a document therebetween. The transparent cover sheet allows a person sending the document by telecopier to create a writing that appears thereagainst in the telecopied mode and yet is subsequently erasable. The telecopy document is retained within the oppositely disposed membranes comprising the assembly to therein facilitate the handling and telecopying thereof.

12 Claims, 2 Drawing Sheets

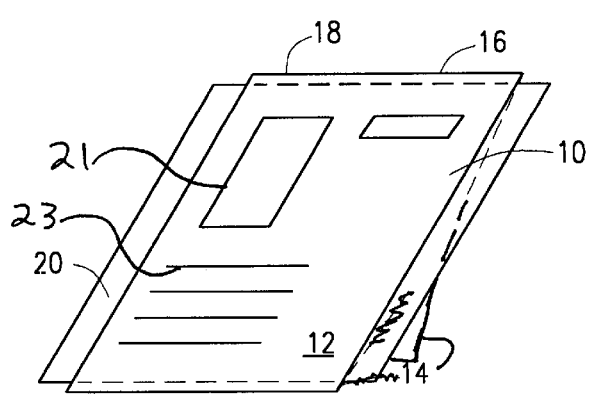
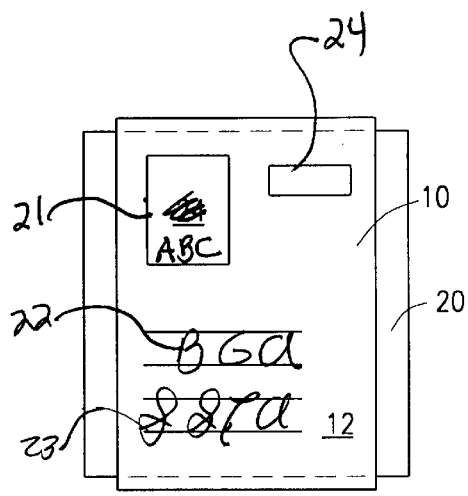
FIG. 1  FIG. 2
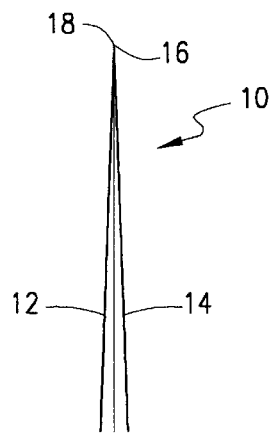
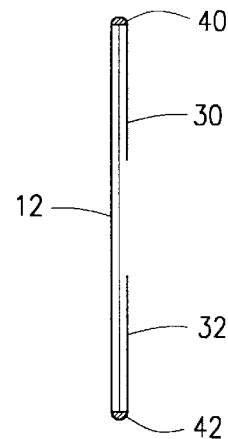
FIG. 3  FIG. 4
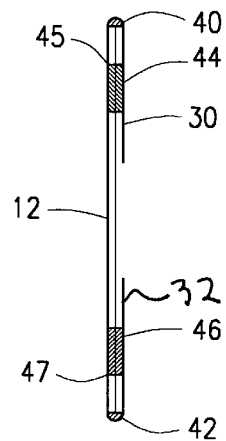
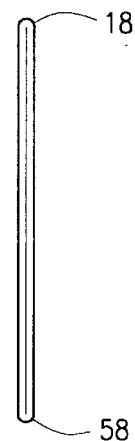
FIG. 5  FIG. 6

TELECOPIER COVER SHEET ASSEMBLY PACKAGE

BACKGROUND OF THE INVENTION

1. Technical Field of the Invention

The present invention relates to telecopier cover sheets and, more particularly, to a transparent telecopier cover sheet incorporating oppositely disposed membranes adapted for securing the telecopy document therebetween.

2. Description of Related Art

The use of telecopiers in homes and offices has become widespread. Telecopy transmission, commonly referred to as faxing, is literally a global form of communication. Consistent with this form of communication is the transmission of the faxed document by utilizing a fax cover sheet. The fax cover sheet is typically a document made of paper that is disposed of after use both by the sending party as well as the party receiving same. This is a waste of natural resources. Trees are needed to create the paper that quickly becomes trash. This action is also a waste of the time and energy necessary to handle the excess paper associated with conventional "faxing."

A variety of prior art methods and apparatus have been developed for creating solutions to the waste described above. The prior art solutions generally incorporate the use of a transparent fax cover sheet. Representative prior art embodiments are shown in U.S. Pat. Nos. 5,178,420, 5,431, 451, and 5,435,601. As discussed in many of these patents, the improvements over the prior art generally include the ability to create a one-time writing upon a reusable, transparent fax cover sheet that has been secured against the document to be faxed. In this way, the party receiving the fax appears to receive a single sheet made up of the writing appearing on both. This effective combining of both permanent and temporary documents has found acceptance in certain business and related telecopying situations.

However, certain inconveniences, inefficiencies and problems are associated with certain prior art structures utilizing one or more embodiments of transparent fax cover sheets. One such problem is associated with the method of an apparatus for temporarily securing the paper document to be faxed to the transparent cover sheet. In some prior art embodiments, the paper document sealed is between plastic laminate. It may be desirable to change the paper document at one time or another, but it is also important to have the paper document securely affixed to the reusable sheet. The present invention addresses this problem by creating a transparent, reusable envelope for fax transmission of a paper document. In one embodiment, the envelope for securing the document includes opposing flap members for securing said document while allowing temporary writing thereon by virtue of the transparent cover sheet forming part of the envelope.

SUMMARY OF THE INVENTION

The present invention relates to a reusable, transparent telecopier cover sheet and assembly permitting securement of the document to be telecopied in engagement therewith. More particularly, one aspect of the invention includes a reusable telecopier cover sheet assembly for a document to be transmitted by telecopier. The assembly comprises a transparent membrane sheet having a size sufficient for covering portions of the document and securing the document thereto. A second membrane is disposed oppositely the first membrane and extends therefrom along a first edge thereof in engagement therewith for securing the document to be transmitted therebetween. The first membrane is also adapted for the application of temporary writing thereupon for communicating information in conjunction with the document to be telecopied placed therebeneath.

In another embodiment, the above referenced invention further includes the first and second membranes being made of transparent plastic and wherein the second membrane is an extension of the first membrane comprising a folded portion thereof. In one embodiment the assembly further includes a third membrane disposed opposite the first membrane and extends therefrom along a second, opposite edge thereof relative to the second membrane section adapted for use with the first and second membranes for the securement of a document for telecopying transmission thereof. In yet another embodiment the second and third membranes are each extensions of the first membrane comprising folded portions thereof. In yet a further embodiment, all of the membranes are made of transparent plastic.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a perspective view of one embodiment of the transparent fax cover sheet assembly of the present invention illustrated with a document to be telecopied positioned therein;

FIG. 2 is a top plan view of the assembly of FIG. 1 illustrating the application of writing thereon;

FIG. 3 is a side elevational cross-sectional view of the assembly of FIG. 1;

FIG. 4 is a side elevational cross-sectional view of a second embodiment of the assembly of FIG. 1;

FIG. 5 is a side elevational cross-sectional view of a third embodiment of the assembly of FIG. 1;

FIG. 6 is a side elevational cross-sectional view of a fourth embodiment of the assembly of FIG. 1.

DETAILED DESCRIPTION

Figure 5A:
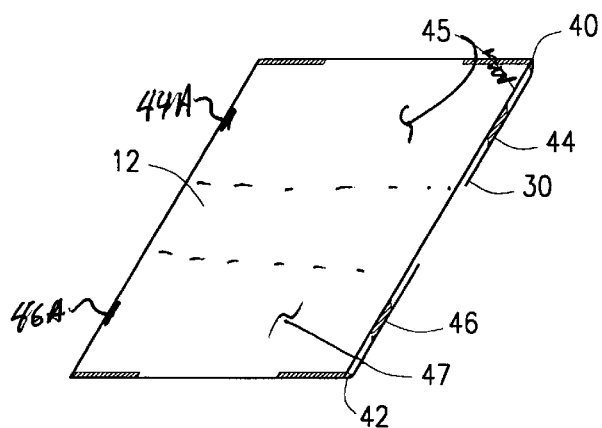
FIG. 5A is a perspective view of the embodiment of FIG. 5.

Referring now to the drawings, and first to FIG. 1, there is shown a perspective view of the fax cover sheet assembly (10) constructed in accordance with the principles of the present invention. The assembly (10) includes a first transparent membrane (12) disposed opposite at least one securing membrane (14). Membrane (12) and (14) may, in the embodiment shown herein, comprise two sections of a single sheet which is folded across fold line (16) therebetween. In the present embodiment fold line (16) comprises end (18) of the assembly (10) and the document (20) to be transmitted by telecopy or fax is inserted between membranes (12) and (14). Document 20 is shown with indicia 21 and 23 printed thereon to facilitate the transfer of information and/or lines for writing as with indicia 23.

Still referring to FIG. 1, the assembly (10) in the present embodiment, can accommodate documents 20—20 of varying sizes. The size of the document (20) to be faxed is not limited because of the manner of construction of assembly 10 of FIG. 1. As shown herein, document 20 is, by way of illustration only, larger than the membrane 12. It may also be of the same size.

Referring now to FIG. 2, there is shown a top plan view of the assembly 10 of FIG. 1 illustrating the application of writing thereon. It may be seen that the writing (22) occurring on the membrane sheet (12) of assembly (10) is viewed in conjunction with indicia 21 and 23 and sender information (24) which appears on the document (20) placed within assembly (10). The sender information 24 may seldom change and thus the document 20 may be reused for multiple fax transmissions, each with different writing 22 conveyed therewith. In this manner, all of the writing (22) appears in the telecopied mode to be a direct association with the document 20 and the words, nomenclature and/or information (24) appearing therewith. Because the assembly (10) is preferably made of plastic with the membrane (12) being transparent plastic, the writing (22) may be erased when conventional marking pens are used. The use of marking pens for writing data on a transparent surface that is erasable with a cloth or encased sponge is common in the prior art. What is not common in the prior art is a transparent fax envelope of the type set forth and described and claimed herein facilitating the telecopying as herein defined.

Still referring to FIG. 2, and as referenced above, it may be seen that the size of the document (20) is, for purposes of example, larger than the assembly (10). In many instances, the assembly (10) will be the exact size of the document (20), but in accordance with the principles of the present invention, different sizes are within the spirit and scope of the present invention. One critical aspect of the present invention is its ability to secure the transparent membrane sheet (12) with the writing (22) disposed thereon secured in relationship with the document (20) during the fax transmission. This is afforded by the manner of fabrication of assembly (10) as described below.

Referring now to FIG. 3, there is shown a side elevational, cross-sectional view of the embodiment of the assembly of FIG. 1. In this particular embodiment, the membrane (12) is oppositely disposed to a membrane (14) of generally the same size, with a fold-line (16) forming edge (18) thereacross. It may be seen that a variety a sizes of documents may be received within the envelope (10) shown in FIG. 3.

Referring now to FIG. 4, there is shown a side elevational, cross-sectional view of a second embodiment of the assembly of FIG. 1 wherein the single second membrane (14) of FIG. 1 has been replaced with a pair of membranes (30) and (32) that are secured along opposite edges (40) and (42) of membrane (12). A variety of manners of securement of membranes (30) and (32) are contemplated in accordance with the spirit and scope of the present invention. Securement can include a glued surface along edges (40) and (42). The use of tape is also within the spirit and scope of the present invention. Suffice it to say that the prior art is replete with methods of securing plastic along edge portions thereof to create the necessary configuration in accordance with the principles of the present invention.

Referring now to FIG. 5, there is shown a side-elevational, cross-sectional view of a third embodiment of the assembly of FIG. 1. In this particular embodiment, the assembly of FIG. 4 is illustrated where the side portions (44) and (46) between membranes (12) and (30) and (12) and (32) are bonded or secured at least along portions thereof on opposite edges of membrane (12) to thereby form a discrete envelope assembly therein. Envelope assembly (45) is thus shown relative to edge (40) while envelope (47) is shown relative to edge (42).

FIG. 5A is a perspective view of the embodiment of the assembly (10) shown in FIG. 5, wherein the envelop assemblies (45) and (47) are shown more clearly. Side portions 44A and 46A are also shown to be handed to define said envelopes.

FIG. 6 is a side-elevational, cross-sectional view of a fourth embodiment of the assembly of FIG. 1 wherein transparent membrane sheets (12) and (14) are formed of a common sheet of transparent material. It may be seen that edge (50) opposite edge (18) is also a fold-line. Such an assembly is preferably constructed from a cylinder of transparent plastic sheet flattened and folder across fold-lines (18) and (58) to therein form an envelope adapted for receiving a sheet of paper therein.

Figure 6A:
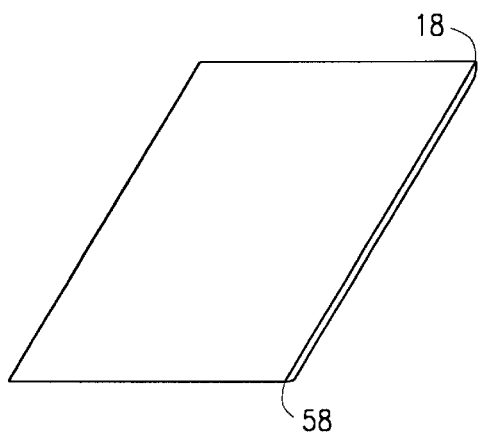
FIG. 6A is a perspective view of the embodiment of FIG. 6.

Referring now to FIG. 6A, there is shown a perspective view of the embodiment of Assembly 10 of FIG. 6. It may be seen that a sleeve is formed for the receipt of the document 20.

Figure 7:
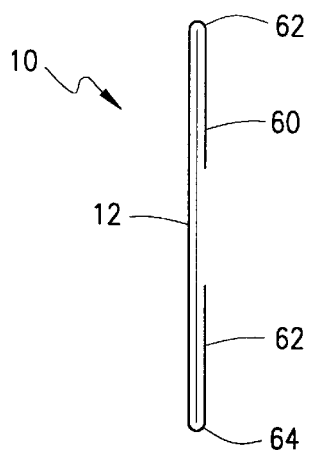
FIG. 7 is a side elevational cross-sectional view of a fifth embodiment of the assembly of FIG. 1.

FIG. 7 is a side-elevational, cross-sectional view of a fifth embodiment of the present invention wherein the envelope (10) is formed of a single sheet of transparent plastic and further wherein opposite section (60) and (62) disposed across fold-lines (62) and (64) respectively, relative to membrane (12) form separate membrane layers thereagainst for the securement of a document therein. It may be seen in FIG. 7 that the length of the document that the assembly (10) is capable of containing is limited but the width is not. Obviously, the width of a document is limited by the telecopying equipment.

The above-referenced Figures illustrate multiple embodiments of the present invention wherein a transparent plastic sheet may be secured against a document to be transmitted by telecopier and wherein all non-permanent indicia may be placed upon the surface of the transparency sheet for erasure therefrom subsequent to telecopy transmission.

The previous description is of a preferred embodiment for implementing the invention, and the scope of the invention should not necessarily be limited by this description. The scope of the present invention is instead defined by the following claims.

What is claimed is:

1. A reusable telecopier cover sheet assembly for a document to be transmitted by telecopier, said assembly comprising:

a transparent membrane sheet having a size sufficient for covering portions of said document and securing said document thereto;

a second membrane disposed oppositely said first membrane and extending therefrom along a first edge thereof in engagement therewith for securing the document to be transmitted therebetween;

said first membrane being adapted for the application of temporary writing thereupon for communicating information in conjunction with the document to be telecopied placed therebeneath; and wherein said second membrane is an extension of said first membrane comprising a folded portion thereof.

2. The assembly set forth in claim 1 wherein said first membrane is made of transparent plastic.

3. The assembly set forth in claim 2 wherein said first and second membranes are made of transparent plastic.

4. The assembly set forth in claim 1 wherein said membranes are made of transparent plastic.

5. The assembly as set forth in claim 1 and further including a third membrane disposed opposite said first membrane and extending therefrom along a second, opposite edge thereof relative to said second membrane section adapted for use with said first and second membranes for the securement of a document for telecopying transmission thereof.

6. The assembly set forth in claim 5 wherein said second and third membranes are each extensions of said first membrane comprising folded portions thereof.

7. The assembly set forth in claim 1 wherein said membranes are made of transparent plastic.

8. The assembly set forth in claim 5 wherein said second and third membranes are each attached to said first membrane along said first and second, opposite edges and adopted for flexible movement relative thereto for facilitating the receipt of said document between said first membrane and said second and third membranes.

9. The assembly set forth in claim 8 wherein said second and third membranes are each attached to said first membrane along opposite side portions thereof forming envelope sections for securing portions of said document therein.

10. A telecopy cover page transmission envelope for a document placed therein and the telecopy transmission thereof, said envelope comprising first and second membranes connected along at least one end to one another to form an assembly adapted for the receipt of said document, said first membrane being formed of transparent material and adapted for the receipt of temporary writing thereagainst for forming an erasable surface for the transmission of information relative to said document, wherein said second membrane is an extension of said first membrane comprising a folded portion thereof, and wherein said first membrane and said second membrane is formed from a single layer of transparent plastic.

11. The envelope as set forth in claim 10 wherein said membranes are each formed of transparent plastic.

12. The assembly set forth in claim 10 wherein said membranes are coupled one to the other along a respective end of said first and said second membrane disposed opposite of said folded portion to form an envelope assembly adapted for the receipt of said document therein.

* * * * *